United States Patent [19]

Andreani et al.

[11] Patent Number: 5,772,737
[45] Date of Patent: Jun. 30, 1998

[54] PROCESS FOR TREATING A GAS MIXTURE BY PRESSURE SWING ADSORPTION

[75] Inventors: Philippe Andreani, Le Kremlin Bicetre; Christian Monereau, Paris; Pierre Petit, Buc, all of France

[73] Assignee: L'Air Liquide, Societe Anonyme pour l'Etude et l'Exploitaton des Procedes Georges, Paris, France

[21] Appl. No.: 827,055

[22] Filed: Mar. 26, 1997

[30] Foreign Application Priority Data

Mar. 27, 1996 [FR] France .................................. 96 03809

[51] Int. Cl.$^6$ .............................................. B01D 53/053
[52] U.S. Cl. .............................. 95/98; 95/101; 95/105; 95/130
[58] Field of Search ................. 95/96–98, 100–105, 95/130, 138

[56] References Cited

U.S. PATENT DOCUMENTS

| | | | |
|---|---|---|---|
| 3,430,418 | 3/1969 | Wagner | 95/100 |
| 3,564,816 | 2/1971 | Batta | 95/100 |
| 3,636,679 | 1/1972 | Batta | 95/100 |
| 3,788,036 | 1/1974 | Lee et al. | 95/101 |
| 4,194,890 | 3/1980 | McCombs et al. | 95/98 X |
| 4,381,189 | 4/1983 | Fuderer | 95/100 |
| 4,468,237 | 8/1984 | Fuderer | 95/100 |
| 4,589,888 | 5/1986 | Hiscock et al. | 95/100 |
| 4,643,743 | 2/1987 | Grader | 95/100 |
| 4,816,039 | 3/1989 | Krishnamurthy et al. | 95/97 |
| 4,981,499 | 1/1991 | Hay et al. | 95/100 |
| 5,223,004 | 6/1993 | Et́ee et al. | 95/98 |
| 5,248,322 | 9/1993 | Kumar | 95/101 |
| 5,250,088 | 10/1993 | Yamaguchi et al. | 95/98 |
| 5,370,728 | 12/1994 | LaSala et al. | 95/101 |
| 5,382,280 | 1/1995 | Choe et al. | 95/98 |
| 5,565,018 | 10/1996 | Baksh et al. | 95/100 |
| 5,620,501 | 4/1997 | Tamhankar et al. | 95/96 X |
| 5,656,065 | 8/1997 | Kalbassi et al. | 95/96 |
| 5,658,371 | 8/1997 | Smolarek et al. | 95/101 |

FOREIGN PATENT DOCUMENTS

| | | |
|---|---|---|
| 3 432 896 | 5/1985 | Germany . |
| 3 433 058 | 3/1986 | Germany . |

*Primary Examiner*—Robert Spritzer
*Attorney, Agent, or Firm*—Young & Thompson

[57] ABSTRACT

Process for treating a gas mixture by pressure swing adsorption wherein for each adsorber (1), the duration ($T_R$) of the countercurrent recompression step is much less than that ($T_D$) of the cocurrent decompression step. The process is particularly useful in the production of oxygen from atmospheric air.

9 Claims, 1 Drawing Sheet

5,772,737

1

PROCESS FOR TREATING A GAS MIXTURE BY PRESSURE SWING ADSORPTION

FIELD OF THE INVENTION

The present invention relates to a process for treating a gas mixture by pressure swing adsorption in a plant comprising at least one adsorber of the type wherein, in the or in each adsorber, a cycle is carried out which comprises a production phase and a regeneration phase, the latter including an initial phase, which includes a cocurrent decompression step, and a final phase, which includes a countercurrent recompression step, The invention applies in particular to the production of oxygen by treating atmospheric air.

The pressures in question here are absolute pressures.

BACKGROUND OF THE INVENTION

Most pressure swing adsorption cycles, intended to separate two or more gases, have, during their sequence of steps, one step at least of cocurrent decompression or depressurization, to which there corresponds at least one countercurrent recompression step which uses the gas output from the cocurrent decompression step.

The aim of these steps is to improve the overall performance of the cycle by partly recovering the fraction of the least adsorbable gas or gases which, at the end of the production step, is or are in the front region and in the free volumes of the adsorber, and by using this fluid to recompress partially at least one adsorber at the end of the regeneration phase.

In the absence of this pair of steps, the least adsorbable gas would be removed during the countercurrent decompression or purge step which follows the cocurrent decompression step, at the same time as the most highly adsorbed fraction of the gas or gases. This gas would then participate in the regeneration of the adsorber by lowering the partial pressure of the most easily adsorbed components, but generally much less effectively than according to the process described above.

In known cycles, irrespective of whether they involve adsorbers which are connected directly together (documents EP-A-354,259 or EP-A-654,439), or one or more adsorbers which are associated with a buffer tank in which the gas output from the cocurrent decompression is temporarily stored (document U.S. Pat. No. 5,370,728), the duration of the two coupled steps is identical or practically identical.

SUMMARY OF THE INVENTION

However, the Applicant has surprisingly found that a process of the aforementioned type, wherein, according to the invention, at least during the recompression step of the final regeneration phase, gas output from the cocurrent decompression step is introduced in countercurrent, the duration of the countercurrent recompression step being less than that of the cocurrent decompression step, allowed the performance of the cycle to be improved substantially.

A process of this type may include one or more of the following characteristics:

- the duration of the countercurrent recompression step is less than 0.8 times, typically less than 0.5 times, that of the cocurrent decompression step;
- the gas output from the cocurrent decompression step is stored temporarily in a buffer tank;
- the process uses a single adsorber;

2

- the mixture to be treated is atmospheric air with a view to the production of oxygen.

BRIEF DESCRIPTION OF THE DRAWINGS

Illustrative embodiments of the invention will now be described with reference to the appended drawings, in which.

DETAILED DESCRIPTION OF THE INVENTION

Figure 1:
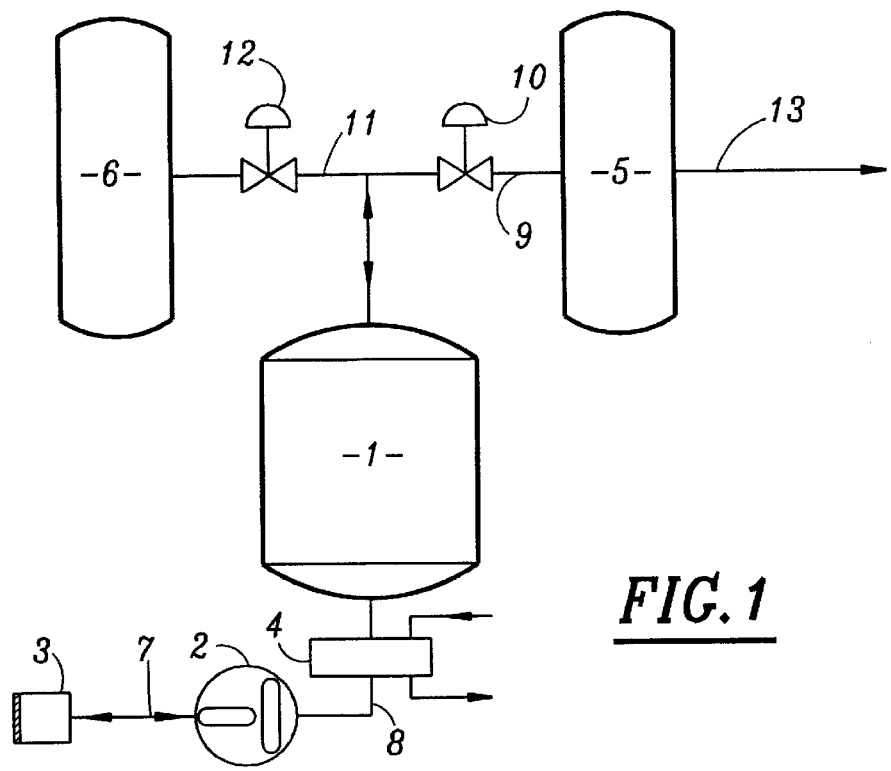
FIG. 1 schematically represents one embodiment of a single-adsorber plant for implementing a process according to the invention.

The plant in FIG. 1 is advantageously intended for producing oxygen, having a purity of the order of 90% to 93%, from atmospheric air. It essentially comprises a single adsorber 1 containing an adsorbent, typically at least one zeolite, a reversible rotary machine 2 forming a compressor and vacuum pump, a filter/silencer 3, a refrigerator 4, a production tank 5 and a buffer tank 6.

The apparatus 2 is connected, on the one hand, via a conduit 7, to the atmosphere through the filter/silencer 3 and, on the other hand, via a conduit 8 which passes through the refrigerator 4, to the inlet of the adsorber 1, which is the lower end thereof. The outlet (upper end) of the adsorber is connected, on the one hand, to the tank 5 via a conduit 9 equipped with a control valve 10 and, on the other hand, to the buffer tank 6 via a conduit 11 equipped with a control valve 12. The production conduit of the plant, which departs from the tank 5, has been indicated at 13.

Figure 2:
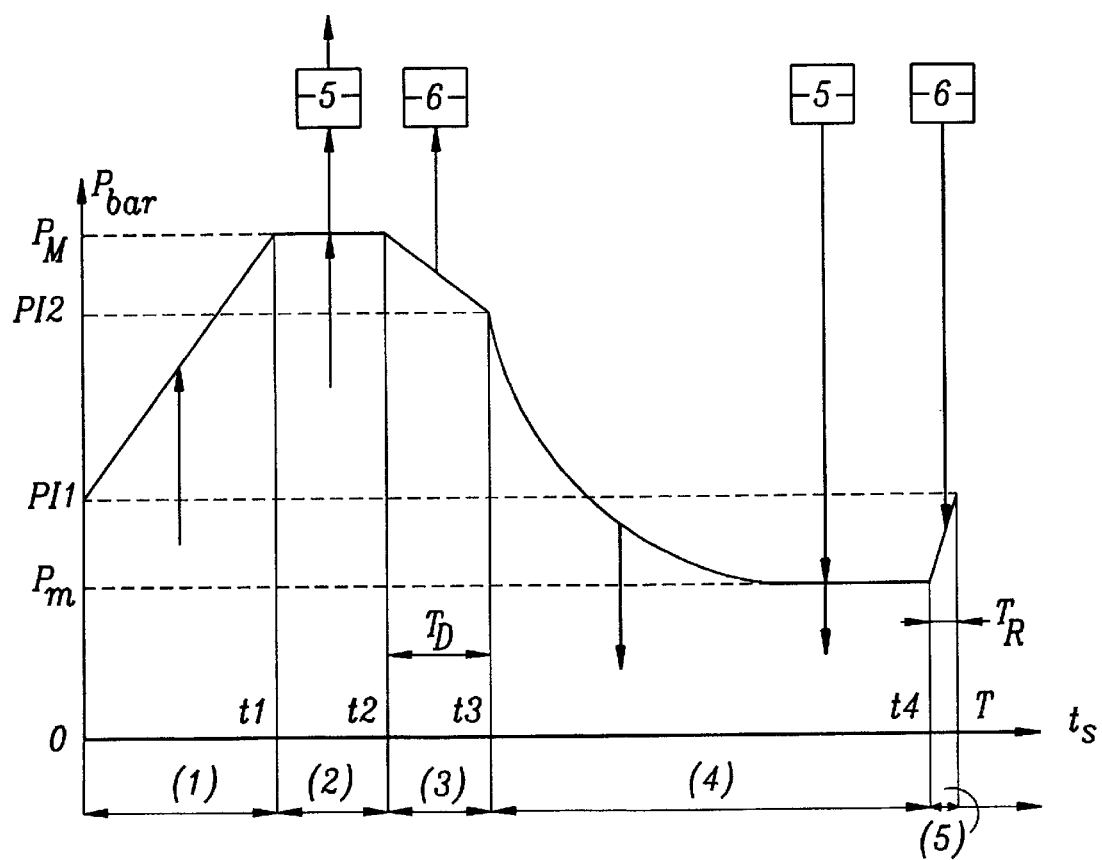
FIG. 2 is a diagram which illustrates an example of a cycle according to the invention, implemented in the plant in FIG. 1.

The plant furthermore includes means, known per se and not shown, for control, regulation and supply of electricity and refrigerant, which are designed to carry out the cycle illustrated in FIG. 2.

In FIG. 2, where the time t is plotted on the abscissa and the absolute pressure P is plotted on the ordinate, the lines oriented by arrows indicate the movements and destinations of the gas flows, and furthermore the direction of flow in the adsorber: when an arrow is in the increasing-ordinate direction (towards the top of the diagram), the flow is termed cocurrent in the adsorber. If the arrow directed upwards is located below the line indicating the pressure in the adsorber, the flow enters the adsorber through the inlet end of the adsorber; if the arrow, directed upwards, is located above the line indicating the pressure, the flow leaves the adsorber through the outlet end of the adsorber, the inlet and outlet ends being respectively those for the gas to be treated and for the gas drawn off in the isobaric production phase; when an arrow is in the decreasing-ordinate direction (towards the bottom of the diagram), the flow is termed countercurrent in the adsorber. If the arrow directed downwards is located below the line indicating the pressure of the adsorber, the flow leaves the adsorber through the inlet end of the adsorber; if the arrow directed downwards is located above the line indicating the pressure, the flow enters the adsorber through the outlet end of the adsorber, the inlet and outlet ends still being those for the gas to be treated and the gas drawn off in the isobaric production phase.

The cycle in FIG. 2, the period T of which is, for example, 86.5 s, comprises the following successive steps:

(1) From t=0 to t1=20 s, final cocurrent recompression using the gas to be treated, from a first intermediate pressure PI1 to the maximum pressure $P_M$ of the cycle, which is, for example, about $1.5 \times 10^5$ Pa.

(2) From t1 to t2=30 s, substantially isobaric production at pressure $P_M$. The production is sent to the tank 5, from which a smaller flow rate of oxygen is drawn off continuously to a user station, via the conduit 13. In practice, as a variant, the production, sent to the tank 5, starts before time t1, during the final pressurization phase at close to the maximum pressure $P_M$ of the cycle.

(3) From t1 to t3=40.5 s, that is to say for a duration $T_D$=10.5 s, cocurrent decompression to a second intermediate pressure PI2. The gas output from the adsorber during this step is sent to the buffer tank 6. As a variant, during this step (3), it is also possible to carry out simultaneous countercurrent decompression.

(4) From t3 to t4=83 s, countercurrent decompression by pumping to the minimum pressure $P_m$ of the cycle, which is, for example, about $0.5 \times 10^5$ Pa, then purge/elution, typically substantially isobaric at pressure $P_m$ by continuing the pumping and, simultaneously, countercurrent introduction of production gas originating from the tank 5.

(5) From t4 to T, that is to say for a duration $T_R$=3.5 s, first countercurrent recompression to the intermediate pressure PI1, using gas originating from the buffer tank 6.

As can be seen, according to one aspect of the invention, the duration $T_D$ of the cocurrent decompression step (3) is much greater than the duration $T_R$ of the first countercurrent recompression step (5), which uses gas output from step (3).

Surprisingly, it has been observed that the performance of a cycle of this type is substantially improved in comparison with that of a cycle which is similar, but in which each step (3) and (5) has the same duration (10.5+3.5)/2=7 s. This is clearly demonstrated in the following table, which corresponds to a plant, such as the one described in FIG. 1, with $P_M=1.5 \times 10^5$ Pa and $P_m=0.45 \times 10^5$ Pa.

| Cycle No. | 1 (Prior art) | 2 (Invention) | 3 (Invention) | 4 (Counter-example) |
|---|---|---|---|---|
| Cycle duration T(s) | 86.5 | 86.5 | 83 | 83 |
| Cocurrent recompression duration $T_D$(s) | 7 | 10.5 | 7 | 3.5 |
| Countercurrent recompression duration $T_R$(s) | 7 | 3.5 | 3.5 | 7 |
| Productivity (m³(s.t.p.) of $O_2/m^3 \times h$) | 35.08 | 37.1 | 37.3 | 35.6 |
| Yield (%) | 57.3 | 59.5 | 57.2 | 54.9 |
| Intrinsic productivity (m³(s.t.p.) of $O_2/m^3 \times$ cycle) | 0.86 | 0.89 | 0.86 | 0.82 |
| Specific energy (kWh/m³ (s.t.p.) of $O_2$) | 0.30 | 0.29 | 0.30 | 0.31 |

The productivity is, conventionally, the hourly production of the plant for 1 m³ of adsorbent; the intrinsic productivity is the production per cycle for 1 m³ of adsorbent; the specific energy is the energy required to produce 1 m³(s.t.p.) of oxygen; and the yield is the ratio of the quantity of oxygen produced to the quantity of oxygen contained in the air which is treated.

In the above table:

Cycle No. 1 is a conventional cycle, in which the durations $T_D$ and $T_R$ are equal.

Cycle No. 2 corresponds to the cycle according to the invention in FIG. 2, with $T_D$=10.5 s and $T_R$=3.5 s. An improvement in all the parameters is observed. In particular, the productivity is increased, while the specific energy is reduced. For its part, the yield is also increased, although this is not, per se, an important parameter in the case of treating atmospheric air, which costs nothing.

Cycle No. 3 is also a cycle according to the invention, but one which differs from the former cycle in that the duration $T_D$ is the same (7 s) as in the conventional cycle No. 1. It is observed that, in comparison with the latter, the specific energy is increased, but that the intrinsic productivity remains unchanged; consequently, since the cycle is shorter, the productivity is greater. A cycle of this type may therefore be beneficial in regions where energy is inexpensive.

In cycle No. 4, by way of counter-example, in contrast to the teachings of the invention, it is the cycle $T_D$ which is reduced. A degradation in all the parameters (productivity, yield, specific energy, intrinsic productivity) is observed. In particular, the drop in intrinsic productivity is greater than the gain which might be expected from the reduction in the duration of the cycle, so that the productivity is reduced.

The invention is also applicable to cycles which differ from the one in FIG. 2 by the fact of simultaneously carrying out, during step (5), cocurrent introduction, into the adsorber, of the gas mixture to be separated, or countercurrent removal in order to complete the elution, or alternatively by temporarily introducing gas from the tank 6 in countercurrent during the purge/elution step 4, typically at the end of the latter.

By way of example, for implementing a cycle of the type described above, with an adsorbent of zeolite 5A type and a pressure PI2 of $1.1 \times 10^5$ Pa, with medium-purity oxygen storage at a pressure differential of about $0.3 \times 10^5$ Pa, the volume of the tank 6 is about 3.5 m³/m³ of zeolite.

For implementation with two adsorbers in parallel, the common use of the two tanks 5 and 6 allows, in particular, continuous use of the vacuum pump and two-stage pseudo-equilibration between the two adsorbers.

What is claimed is:

1. Process for treating a gas mixture by pressure swing adsorption in a plant comprising at least one adsorber (1), wherein, in the or in each adsorber (1), a cycle is carried out which comprises a production phase and a regeneration phase, the latter including an initial phase, which includes a cocurrent decompression step, and a final phase, which includes a countercurrent recompression step, wherein, at least during the recompression step (5) of the final regeneration phase, gas output from the cocurrent decompression step (3) is introduced in countercurrent, and in that the duration ($T_R$) of the countercurrent recompression step (5) is less than that ($T_D$) of the cocurrent decompression step (3).

2. Process according to claim 1, wherein the duration ($T_R$) of the countercurrent recompression step is less than 0.8 times that ($T_D$) of the cocurrent decompression step.

3. Process according to claim 2, wherein the duration ($T_R$) of the countercurrent recompression step is less than 0.5 times that ($T_D$) of the cocurrent decompression step.

4. Process according to claim 1, wherein the gas output from the cocurrent decompression step (3) is stored temporarily in a buffer tank (6).

5. Process according to claim 1, employed in a plant wherein said at least one adsorber is a single adsorber (1).

6. Process according to claim 1, wherein the regeneration phase comprises an intermediate purge/elution phase (4) which uses a pump/elution gas.

7. Process according to claim 6, wherein the purge/elution gas is production gas.

8. Process according to claim 7, wherein the purge/elution gas is stored temporarily in a production tank (5).

9. Process according to claim 1, wherein the gas mixture treated is air and produces oxygen.

* * * * *